United States Patent
Saito (10) Patent No.: US 7,769,812 B2
(45) Date of Patent: Aug. 3, 2010

(54) APPARATUS AND METHOD FOR RECEIVING IMAGE

(75) Inventor: Kyoji Saito, Kanagawa (JP)

(73) Assignee: Panasonic System Networks Co., Ltd., Fukuoka-Shi (JP)

( * ) Notice: Subject to any disclaimer, the term of this patent is extended or adjusted under 35 U.S.C. 154(b) by 355 days.

(21) Appl. No.: 11/836,465

(22) Filed: Aug. 9, 2007

(65) Prior Publication Data

US 2007/0283233 A1 Dec. 6, 2007

Related U.S. Application Data

(62) Division of application No. 09/618,716, filed on Jul. 18, 2000, now Pat. No. 7,305,440.

(30) Foreign Application Priority Data

Nov. 11, 1999 (JP) .................................. 11-321411

(51) Int. Cl.
*G06F 15/16* (2006.01)
(52) U.S. Cl. .................. 709/206; 709/204; 709/207
(58) Field of Classification Search ................ 709/204, 709/206, 207
See application file for complete search history.

(56) References Cited

U.S. PATENT DOCUMENTS

| | | |
|---|---|---|
| 5,812,278 A | 9/1998 | Toyoda et al. |
| 5,832,208 A | 11/1998 | Chen et al. |
| 5,881,233 A | 3/1999 | Toyoda et al. |
| 5,937,162 A | 8/1999 | Funk et al. |
| 5,999,932 A | 12/1999 | Paul |
| 6,025,931 A | 2/2000 | Bloomfield |
| 6,101,244 A | 8/2000 | Okada |

(Continued)

FOREIGN PATENT DOCUMENTS

EP 0833492 4/1998

(Continued)

OTHER PUBLICATIONS

Anonymous: "TIFF Revision 6.0Final—Jun. 3, 1992" [Online] Mar. 1995, Adobe Developers Association, Mountain View, CA, USA, retrieved from the Internet: URL:http://partners.adobe.com/public/developer/en/tiff6.pdf (retrieved on Oct. 8, 2007).

(Continued)

*Primary Examiner*—Kenny S Lin
(74) *Attorney, Agent, or Firm*—Greenblum & Bernstein P.L.C.

(57) ABSTRACT

An image communication apparatus includes a transmitter that transmits an e-mail with data attached, via a computer network, a receiver that receives an e-mail with data attached, via the computer network, and a controller that converts the attached data into image data. The controller judges whether or not the received e-mail is an error mail, the error mail being related to the e-mail transmitted by the image communication apparatus, based on a search of a header of the received e-mail for a predetermined character string. The predetermined character string is related to a sender of the error mail. The controller determines that the received e-mail in the error mail, when the result of the search indicates that the header of the received e-mail includes the predetermined character string.

14 Claims, 11 Drawing Sheets

U.S. PATENT DOCUMENTS

| | | | |
|---|---|---|---|
| 6,128,101 | A | 10/2000 | Saito et al. |
| 6,137,597 | A | 10/2000 | Kanaya |
| 6,239,881 | B1 | 5/2001 | Shaffer et al. |
| 6,266,692 | B1 | 7/2001 | Greenstein |
| 6,374,291 | B1 | 4/2002 | Ishibashi et al. |
| 6,393,464 | B1 | 5/2002 | Dieterman |
| 6,393,465 | B2 | 5/2002 | Leeds |
| 6,417,930 | B2 | 7/2002 | Mori |
| 6,421,709 | B1 | 7/2002 | McCormick et al. |
| 6,434,601 | B1 | 8/2002 | Rollins |
| 6,437,873 | B1 | 8/2002 | Maeda |
| 6,496,573 | B1 | 12/2002 | Ichimura |
| 6,545,768 | B1 | 4/2003 | Matsubara et al. |
| 6,594,697 | B1 | 7/2003 | Praitis et al. |
| 6,618,749 | B1 | 9/2003 | Saito et al. |
| 6,650,440 | B1 | 11/2003 | Wing |
| 6,654,787 | B1 | 11/2003 | Aronson et al. |
| 6,687,742 | B1 | 2/2004 | Iwazaki |
| 6,823,367 | B1 | 11/2004 | Wakasugi et al. |
| 6,832,244 | B1 | 12/2004 | Raghunandan |

FOREIGN PATENT DOCUMENTS

| | | |
|---|---|---|
| EP | 0898410 | 2/1999 |
| EP | 0923034 | 6/1999 |
| EP | 923226 | 6/1999 |
| EP | 0923226 | 6/1999 |
| EP | 1022691 | 7/2000 |
| JP | 5 316144 | 11/1993 |
| JP | 242326 | 9/1996 |
| JP | 8 286988 | 11/1996 |
| JP | 9 219723 | 8/1997 |
| JP | 9 305505 | 11/1997 |
| JP | 308766 | 11/1998 |
| JP | 10 336232 | 12/1998 |
| JP | 11 15755 | 1/1999 |
| JP | 11 27501 | 1/1999 |
| WO | 99 33188 | 7/1999 |

OTHER PUBLICATIONS

"Rblfilter," retrieved from <URL: http:psq.com/~brain/software/rblfilter/>(last updated Aug. 29, 1999) <URL: http:psq.com/software/rblfilter/man.html>.

Patel et al., "The Multimedia Fax-MIME Gateway", IEEE 1994.

Toyoda et al., "RFC2305: A Simple Mode of Facsimile Using Internet Mail", Mar. 1998. Retrieved from http://www.faqs.org/rfcs/rfc2305.html on May 15, 2004.

English Language Abstract of JP 8-242326.
English Language Abstract of JP 11-27501.
English Language Abstract of JP 5-316144.
English Language Abstract of JP 10-336232.
English Language Abstract of JP 10-308766.
English Language Abstract of JP 9-305505.
English Language Abstract of JP 9-219723.
English Language Abstract of JP 8-286988.

FIG.11

APPARATUS AND METHOD FOR RECEIVING IMAGE

CROSS-REFERENCE TO RELATED APPLICATION

The present application is a divisional application of U.S. application Ser. No. 09/618,716 filed on Jul. 18, 2000. The present invention relates to the subject matter disclosed in Japanese Patent Application No. 11-321411, filed on Nov. 11, 1999, the disclosures of each of which are expressly incorporated herein by reference in their entirety.

BACKGROUND OF THE INVENTION

1. Field of the Invention

The present invention relates to an image communication apparatus and an image communication method.

2. Background Information

In the apparatus on the receiving side such as a personal computer etc., that receives E-mail to read, all received E-mail data is stored to a secondary storage device, which the apparatus has, regardless of the apparatus on the sender side and the content, and the user confirms the content, thereafter printing, displaying (hereinafter referred to as outputting) data. In this case, the user reads the contents of error mail and delivery status notification mail without distinguishing them from normal E-mail so as to make a distinction therebetween.

While, there has been in practical use Internet facsimile apparatus (hereinafter referred to as IFAX) that performs data transmission and reception over the Internet using E-mail as disclosed in, for example, Unexamined Japanese Patent Publication No, 8-242326 and its corresponding U.S. Pat. No. 5,881,233.

The IFAX converts binary image data to text data format and appends it to E-mail to transmit. Then, if there is an appending file in E-mail, the receiving side decompresses it and prints out it. Namely, instead of outputting received data after the user reads the data, arrived data is sequentially printed out and the user reads the printed data. This feature is similar to that of the normal facsimile, e.g. G3 facsimile.

In conventional IFAX, all of header information, document information, and image data included in the received data are printed out without making a distinction among kinds of received data. However, there is a case in which data having no value for printing is included depending on the kind of E-mail.

For example, in a case where received mail data is error mail, image data remains as it is converted to the text format. Then, if error mail is printed out without distinguishing it from normal E-mail, the large amount of information, which is incomprehensible and unnecessary to the receiver, is printed out. As a result, the user cannot identify the original document and this will result in a waste of resources such as recording paper.

The applicant of the present invention has proposed an error mail discriminating method in Unexamined Japanese Patent Publication No. 11-15755, its corresponding U.S. patent application Ser. No. 09/099,528 and its corresponding EP 0 923 034 A1. Specifically, error mail is accompanied with all of the contents of E-mail (hereinafter referred to as original mail) transmitted by the sender. The header of this original message always contains a fixed massage such as "X-mailer: Internet FAX" (hereinafter referred to as "header fixed message"). In addition, document information of the body always includes a message such as "this mail accompanied image data of ITFF-format" (hereinafter referred to as "document fixed message). Moreover, the first portion of text-format image data of the body always includes a fixed code (hereinafter referred to as "image data fixed coded") such as "SUkq . . ."

Therefore, the error mail body contains error-related information, original message header and error mail body. This also includes a header fixed message, document fixed message, and image data fixed code.

IFAX disclosed by the above-mentioned Publications collates the header fixed message, document fixed message and image data fixed code, respectively, and if all of them agree, it judges that the received mail data is error mail.

Though a mail server generates error mail, there is a kind of the mail server that rewrites the content of original message. More specifically, the mail server rewrites a boundary that indicates a divider for mail data structure. The rewriting of boundary has a problem in which identification of error mail cannot be performed correctly by the conventional method.

The following will explain the principle. The header defines the boundary. For example, "−+−+MGCS−+−+" is defined as a boundary. Then, in according to this definition, "−+−+MGCS−+−+" is placed at the boundary between the respective portions (header, error-related information, and the like) so as to divide the structure of each portion. Then, a certain server performs processing for rewriting this "−+−+MGCS−+−+" to another one at an error mail generating time. In this processing, processing for rewriting one in which "−+−+MGCS−+−+" is written at the original message is carried out as well as the header. The reason why this rewrite processing is performed is unclear, but the server that carries out such processing exists resultantly.

In the prior art, in the case of processing error mail generated by this server, the IFAX judges that the mail is one that is transmitted by itself when the IFAX checks on the boundary at the original message of received error mail and this boundary is the same as the self boundary. However, since the boundary is rewritten, it is judged that this is not the data has been transmitted by the IFAX, so that determination of error mail cannot be correctly carried out.

If such a mistake occurs, error mail is printed out without distinguishing it from normal E-mail and the large amount of information, which is incomprehensible and unnecessary to the receiver, is printed out. As a result, the user cannot identify the original document and this will result in a waste of resources such as recording paper.

SUMMARY OF THE INVENTION

The present invention relates to an image receiving apparatus capable of performing identification of error mail more correctly, and its method.

In order to solve the above-mentioned problem, the present invention identifies error mail based on whether or not received mail data includes a character string that the sender of error mail may describe in a sender field.

Many of senders of error mail such as mail servers describe predetermined character strings such as "DEAMON", "DELIVERY" and the like. For this reason, it is analyzed whether or not these character strings are included in received mail data. If they are included, it is identified that received mail is error mail. This makes it possible to identify error mail automatically. In addition, it is possible to identify error mail with reliability even if the mail server does not append original message to the error mail without rewriting the original message.

Moreover, the apparatus of the present invention determines whether received mail data is multipart structure or single-part structure. Then, if it is multipart structure, the apparatus of the present invention searches an original message part accompanied with an original message, and checks whether or not an image data fixed code is included at the head of image data part of this original message part. While, if it is single-part structure, the apparatus of the present invention scans received mail data and searches the image data fixed code.

Some mail servers generate error mail with the multipart structure and append the original message to the accompanying file part, and others generate error mail with the single-part and include the content of original message in error mail as it is. Since the present invention identifies error mail by the method, which is suitable for each structure, after determining the structure of received mail data, it is possible to identify error mail more surely.

DETAILED DESCRIPTION OF THE EXEMPLARY EMBODIMENT

With reference to the accompanying drawings, an embodiment of the present invention will now be explained in detail below.

Figure 1:
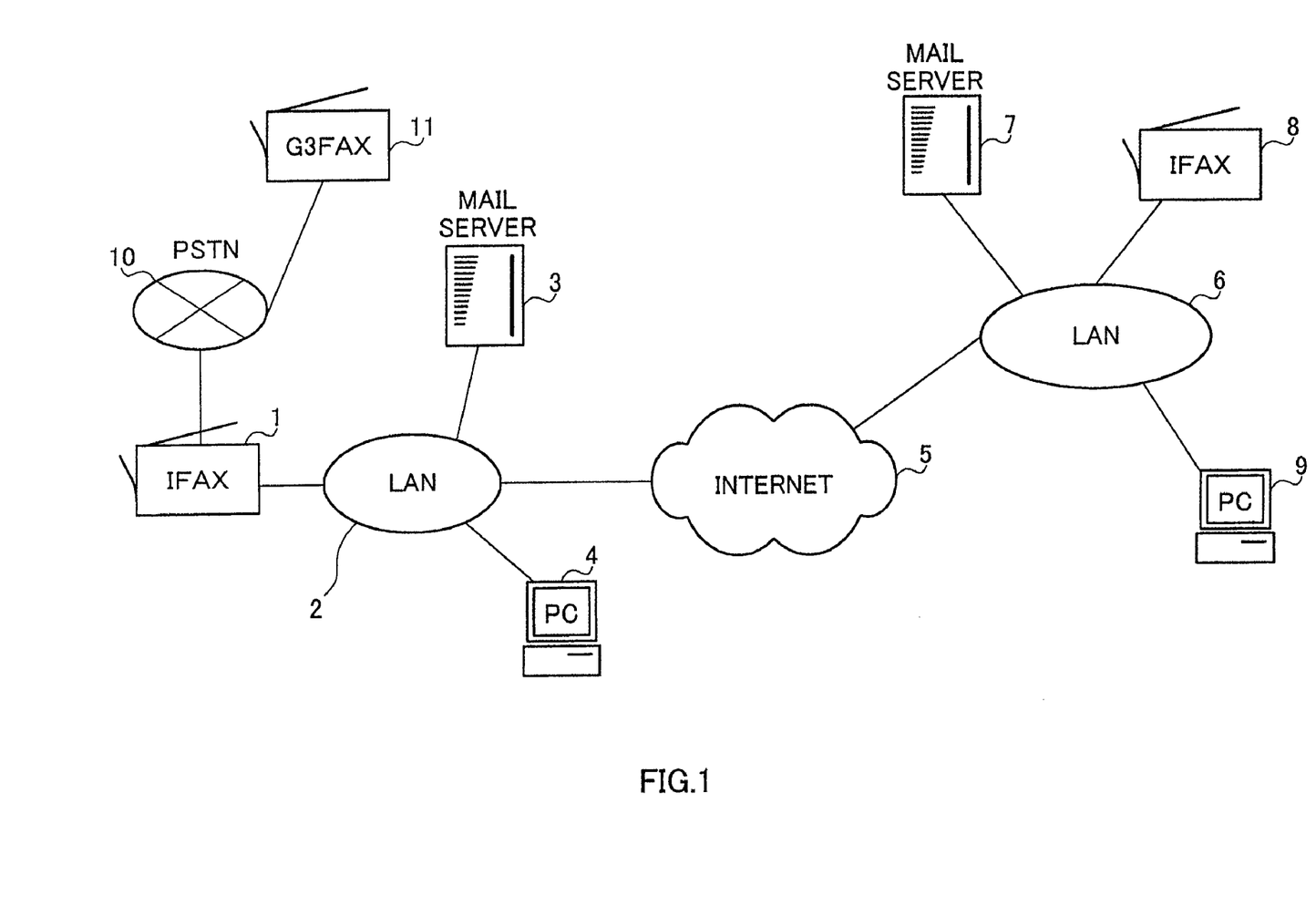
FIG. 1 is a conceptual view showing a network system in which the Internet facsimile apparatus according to the embodiment of the present invention operates.

FIG. 1 is a conceptual view showing a network system in which the Internet facsimile apparatus according to the embodiment of the present invention operates.

An Internet facsimile apparatus 1 (hereinafter referred to as IFAX) according to the above embodiment is connected to a local area network (LAN) 2. A mail server 3 and a personal computer (PC) 4, which are installed in the same local area as the IFAX 1, are connected to the LAN 2. In addition, the LAN 2 is connected to the Internet 5. A mail server 7, an IFAX 8, and a PC 9 are connected to this LAN 6. Moreover, IFAX 1 is connected to a public switched telephone network (PSTN) 10 and can perform facsimile communication with G3 FAX 11 via PSTN 10.

IFAX 1 transmits and receives image data between, for example, the IFAX 8 and the IFAX 1 by use of e-mail. First, E-mail is transmitted to the mail server 3 on the transmitting side. The mail server 3 on the transmitting side transfers E-mail to the mail server 7 on the receiving side. The mail server 7 on the receiving side stores this E-mail. The IFAX 8 on the receiving side accesses the mail server 7 on the receiving side, and receives E-mail. Here, if the address of E-mail transmitted by IFAX 1 is incomprehensible, the mail server 3 on the transmitting side sends error mail back to IFAX 1.

Figure 2:
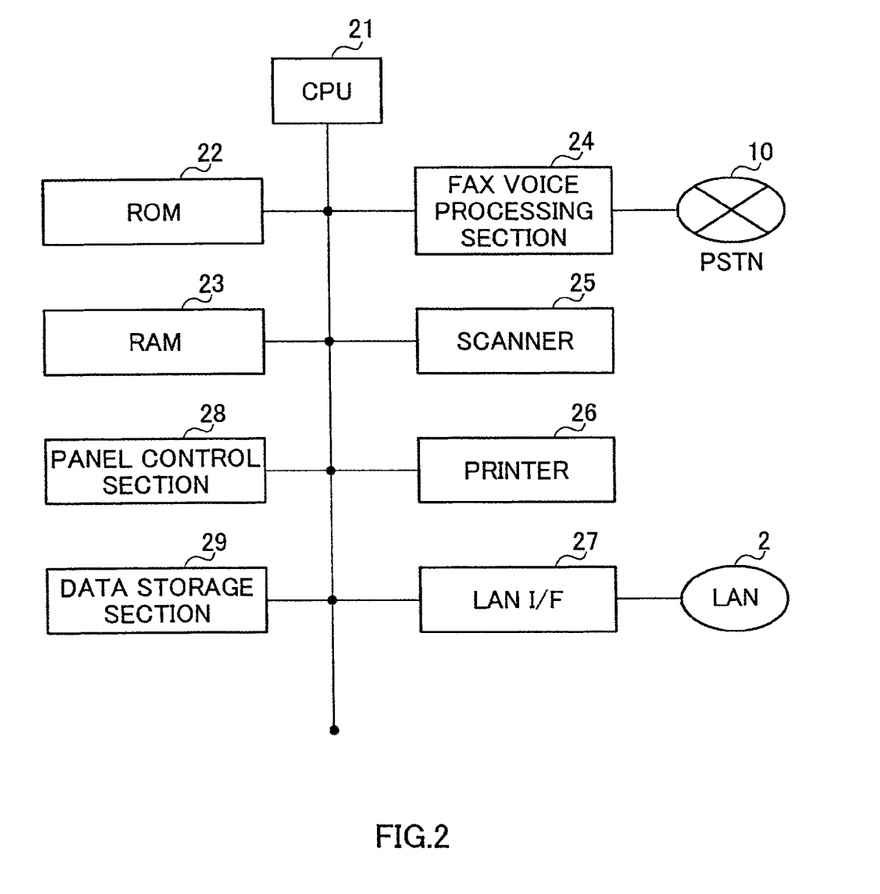
FIG. 2 is a block diagram showing hardware of the Internet facsimile apparatus according to the above embodiment.

FIG. 2 is a block diagram showing hardware of the Internet facsimile apparatus according to the above embodiment. A CPU 21 executes a program, and performs control of the entirety of the apparatus. A ROM 22 stores the program to be executed by the CPU 11.

A RAM 23 has a work area where the program is executed, and a buffer area for temporarily storing various data such as E-mail, an image file, etc.

A FAX voice processing section 24 modulates facsimile data and a voice and outputs modulated data to PSTN 10, and demodulates modulated data received from the PSTN 10 to facsimile data and voice data.

A scanner 25 scans an original, and obtains image data. A printer 26 prints out various data including image data received.

A LAN interface 27 executes a protocol necessary for transmitting and receiving data on the LAN 2.

A panel control section 28 comprises dial keys and a touch panel, and receives operations such as a specification of a communication partner, an instruction of a transmission start, etc., which are executed by an operator.

A data storage section 29 stores received mail data. The data storage section 29 is composed of a secondary storage device such as nonvolatile memory, e.g., a flash memory or a hard disk.

Figure 3:
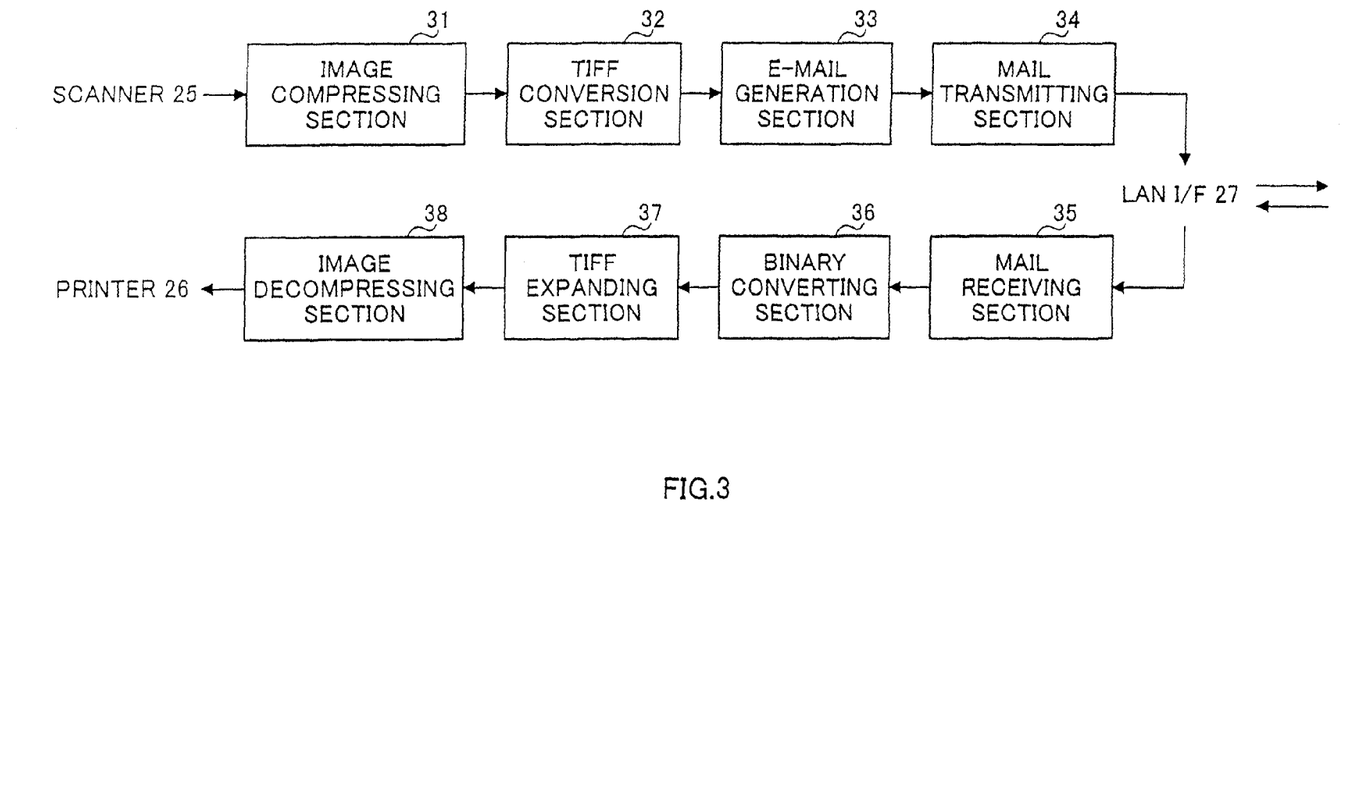
FIG. 3 is a block diagram showing the basic functions of the Internet facsimile apparatus according to the above embodiment.

Next, the functions of IFAX of the embodiment of the present invention will be explained with reference to FIG. 3. FIG. 3 is a block diagram showing the basic functions of IFAX according to the above embodiment.

This IFAX transmits and receives E-mail using LAN interface 27 via the computer network such as LAN 2. More specifically, an image compressing section 31 compresses raw image data (for example, bit map data) scanned by the scanner 25 in a compression format such as HM so as to obtain a compressed file. The compression is performed in unit of one page of the original. Next, a TIFF conversion section 32 converts these compressed files to one ITFF (Tag Image File Format) file. An E-mail generation section 33 converts the TIFF file appends this ITFF file to multipart mail in accordance with for example MIME (Multipurpose Internet Mail Extension). By processing so far, image data is converted to E-mail format. A mail transmitting section 34 transmits this E-mail via LAN interface 27 using mail transfer protocols such as SMTP and the like.

On the other hand, a mail receiving section 35 receives E-mail via the LAN interface 27 using mail transfer protocols such as SMTP, POP (Post Office Protocol, etc. This E-mail is multipart mail, and the TIFF file is converted to character data, that is, text code, and appended to the accompanying file part. A binary converting section 36 binary converts the text code of the accompanying file part of the multipart mail so as to obtain a TIFF file. A TIFF expanding section 37 opens this TIFF file. An image decompressing section 38 decompresses compressed data included in this TIFF file to obtain row image data. By processing so far, E-mail is converted to an image data format. The binary converting section 36, TIFF expanding section, and image decompressing section 38 are hereinafter called format converting section in a word. This row image data is printed out by the printer 26.

Figure 4:
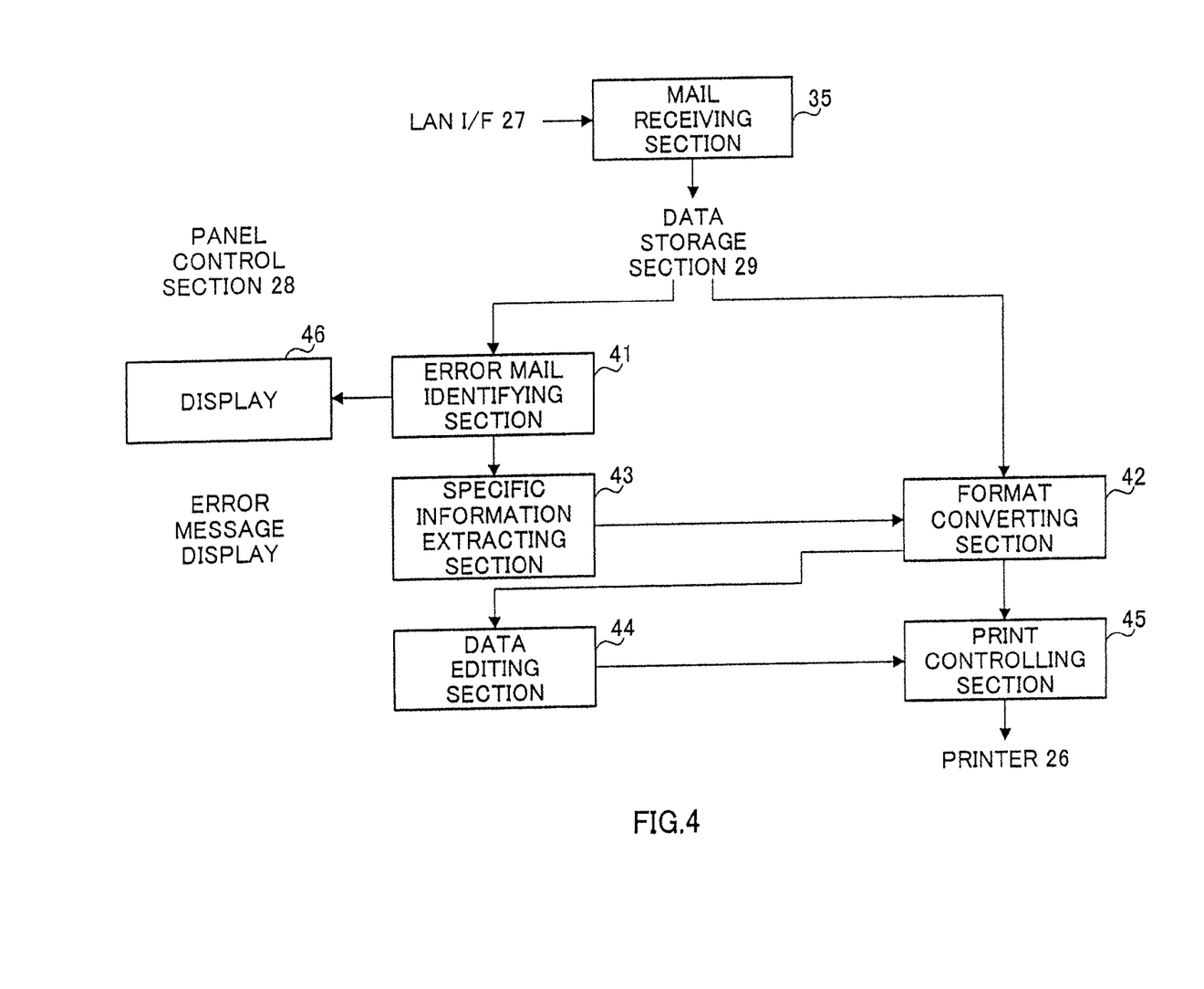
FIG. 4 is a block diagram showing the configuration relating to error mail identification and error processing in the Internet facsimile apparatus according to the above embodiment.

FIG. 4 is a block diagram showing the configuration relating to error mail identification and error processing in the Internet facsimile apparatus in the above embodiment.

Mail data received by the mail receiving section 35 is stored to the data storage section 29. An error mail identifying section 41 determines whether or not received mail data is error mail. If received mail data is not error mail, the error mail identifying section 41 commands a format converting section 42 to convert E-mail to image data. On the other hand, if received mail data is error mail, the error mail identifying section 41 commands the respective sections to be explained below to execute error processing.

A specific information extracting section 43 is a filter that determines whether or not a specific code is included in received mail data, and extracts specific information from error mail. Herein, specific information, for example, is information relating to error, image information of the original document, information of error host, cause of error, information relating to date and time.

A data editing section 44 performs data edition to combine image data, which is normally output to another page, into one page, and to delete a part of image data over a plurality of pages and contain it on one page. In addition, the data editing section 44 adds a message such as an error message, and the like to image data.

A print controlling section 45 controls the printer 26 to print out image data. A display 46 is provided in the panel control section 28 and displays the error message and the like.

Figure 5:
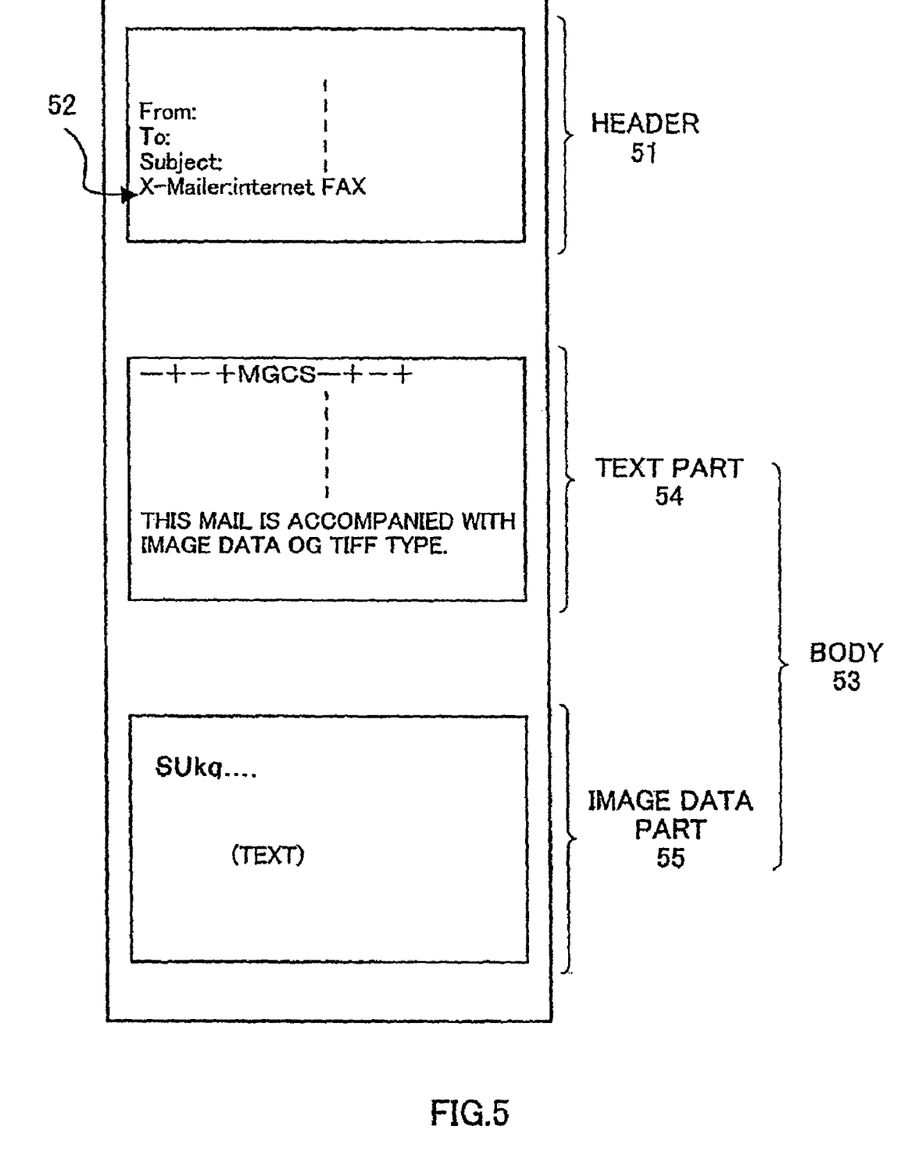
FIG. 5 is a view showing one example of the original message, which is transmitted by the Internet facsimile apparatus according to the above embodiment.
Figure 6:
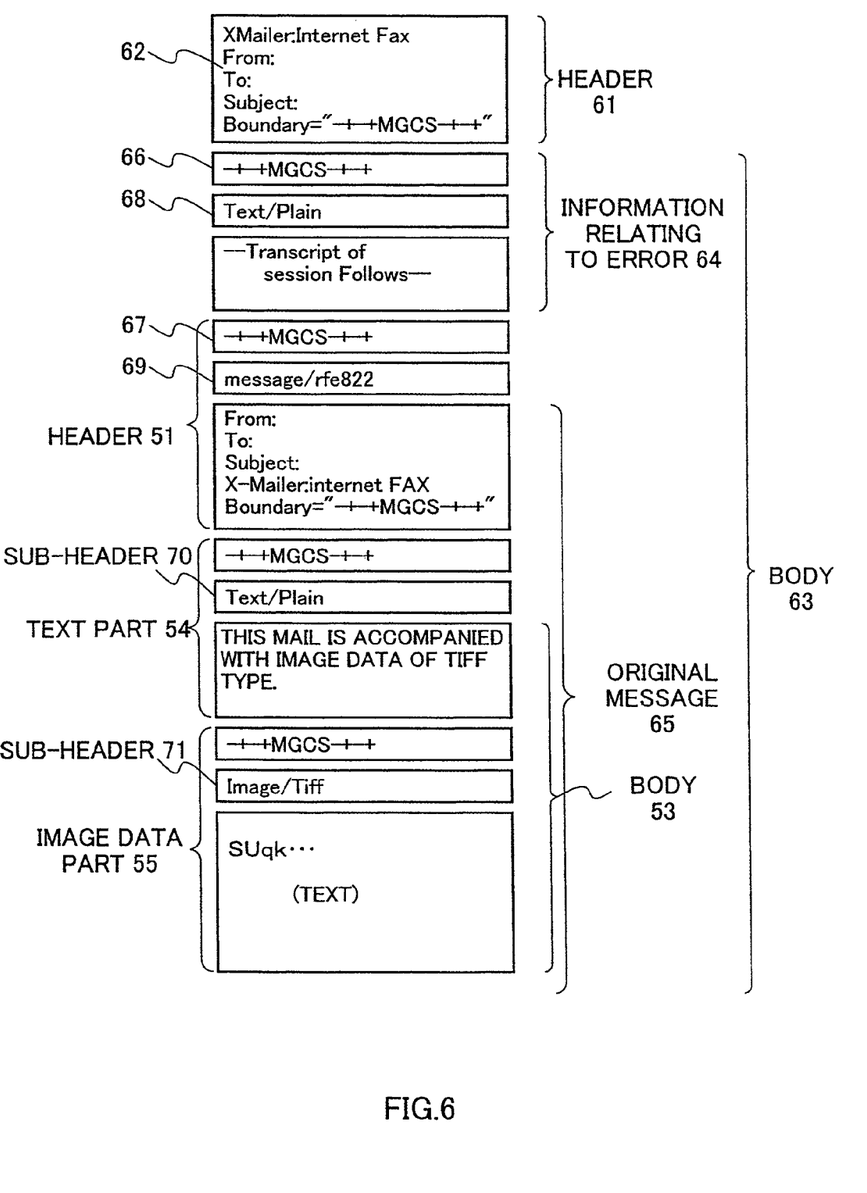
FIG. 6 is a view showing one example of error mail, which is received by the Internet facsimile apparatus according to the above embodiment.

FIG. 5 is a view showing one example of the original message, which is transmitted by IFAX according to the above embodiment. FIG. 6 is a view showing one example of error mail, which is received by IFAX according to the above embodiment.

As shown in FIG. 5, a header 51 includes [X-mailer:] field 52. In a case of the original message transmitted by IFAX 1, a fixed message, that is, "Internet FAX" is described in [X-mailer:] field. This fixed massage is hereinafter referred to as "header fixed message." IFAX 1 stores this header fixed message.

A text part (document information) 54 of a body 52 of the original message includes a fixed message such as "this mail is accompanied with image data of TIFF format." This fixed message is called "document fixed message." Moreover, image data is incorporated into an image data part 55 of a body 53 in text format. The first part of this image data contains a fixed code such as [SUkq . . . ]. This fixed code is hereinafter called "image data fixed code." IFAX 1 stores these fixed message and fixed code.

Furthermore, as illustrated in FIG. 5, [X-mailer:] field is not generally included in a header 61 of error mail. Moreover, specific character strings (for example, DEAMON, mailer, DELIVERY, SYSTEM, POST MASTER, and the like) are described in [From:] field 62 of the header 61.

A body 63 of error mail includes all of information 64 relating to error, and original message 65 as they are. Therefore, the original message 65 includes the above-mentioned header fixed message, document fixed message, and image data fixed code.

This error mail has the multipart structure in accordance with MIME, and the like. Therefore, the header 61 contains a character string, which indicates that this mail is the multipart, for example, "Content-Typemultipart/mixed."

In addition, boundaries 66 and 67, which show the border between the parts, are inserted to the heads of parts 64 and 65 of the body 63 of error mail, respectively. After the boundaries 66 and 67, sub-headers 68 and 69 are added, respectively. In the sub-headers 68 and 69, specific character strings that show the kinds of parts 64 and 65, are included. In the case of text part 64, "text/plain" is described in the sub-header 68. In the case of original message part 65, "message/rfc822" is described n the sub-header 69.

Figure 7:
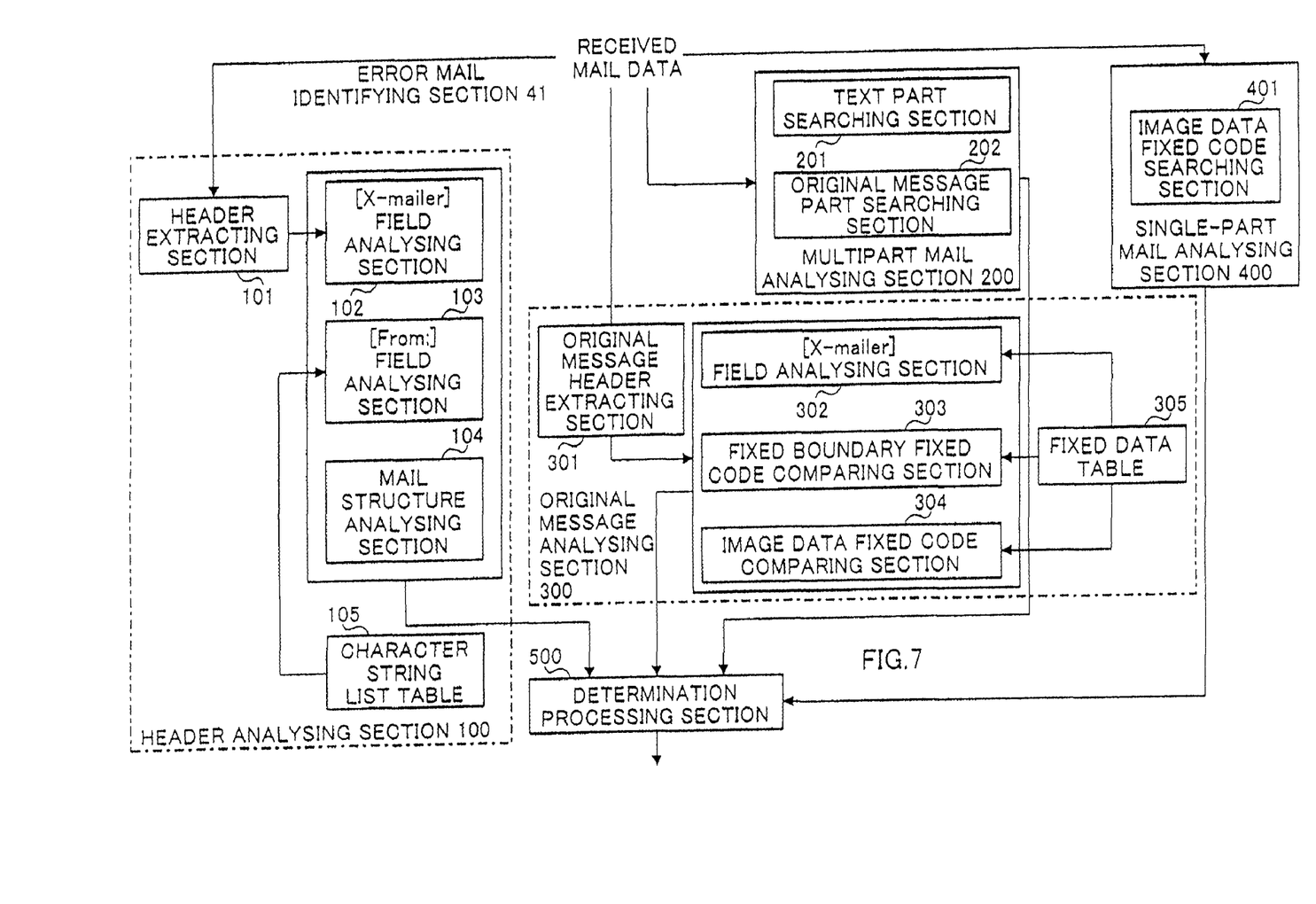
FIG. 7 is a block diagram showing an error mail identifying section of the Internet facsimile apparatus according to the above embodiment.

FIG. 7 is a block diagram showing the error mail identifying section of the Internet facsimile apparatus according to the above embodiment. The error mail identifying section 41 comprises four sections, which analyze E-mail data, that is, a header analyzing section 100, multipart mail analyzing section 200, original message analyzing section 300, single-part mail analyzing section 400, and determination processing section 500.

The header analyzing section 100 analyzes the header of received mail data. The header analyzing section 100 comprises a header extraction section 101, [X-mailer:] field analyzing section 102, [From:] field analyzing section 103, mail structure analyzing section 104, and character string list table 105.

The [X-mailer:] field analyzing section 102 checks the presence or absence of [X-mailer:] field in received mail data. The [From:] field analyzing section 103 checks whether or not the character string included in the [From:] field of header matches the character string registered in the character string list table 105. The character string list table 105 registers the character string that may be used in [From:] field by the mail server.

The mail structure analyzing section 104 checks whether or not the header includes the character, which indicates that received mail data is the multipart structure, e.g., "Content-Type: multipart/mixed."

The multipart mail analyzing section 200 has a text part searching section 201 and an original message part searching section 202 so that they search that the text part and original message part are included respectively when received mail data is the multipart structure. In a case where a character string, which indicates that the corresponding part is text data, for example, "text/plain" is included in the sub-header of a certain part contained in the body of received mail data, the text part searching section 201 judges that this part is the text part. Furthermore, in a case where a character string, which indicates that the corresponding part is the original message, for example, "message/rfc 822" is included in the sub-header of a certain part contained in the body of received mail data, the text part searching section 202 judges that this part is the original message part.

The original message analyzing section 300 comprises an original message header extracting section 301, [X-mailer:] field analyzing section 302, fixed boundary fixed code comparing section 303, image data fixed code comparing section 304, and fixed data table 305. The boundary fixed code is a character string, which is used as a boundary in the original message by IFAX at a transmitting time. For example, "+-+- MGCS+-+-" can be named, but this is not limited. The boundary fixed code and image data fixed code are registered in the fixed data table 305.

The single-part mail analyzing section 400 comprises an image data fixed code searching section 401. In a case where received mail data is error mail and single-part structure, this image data fixed code searching section 401 scans the entirety of received mail data to search an image data fixed code.

The determination processing section 500 receives the analytical results from the header analyzing section 100, multipart mail analyzing section 200, original message analyzing section 300, and single-part mail analyzing section 400, and distinguishes between error mail and normal E-mail.

Figure 8:
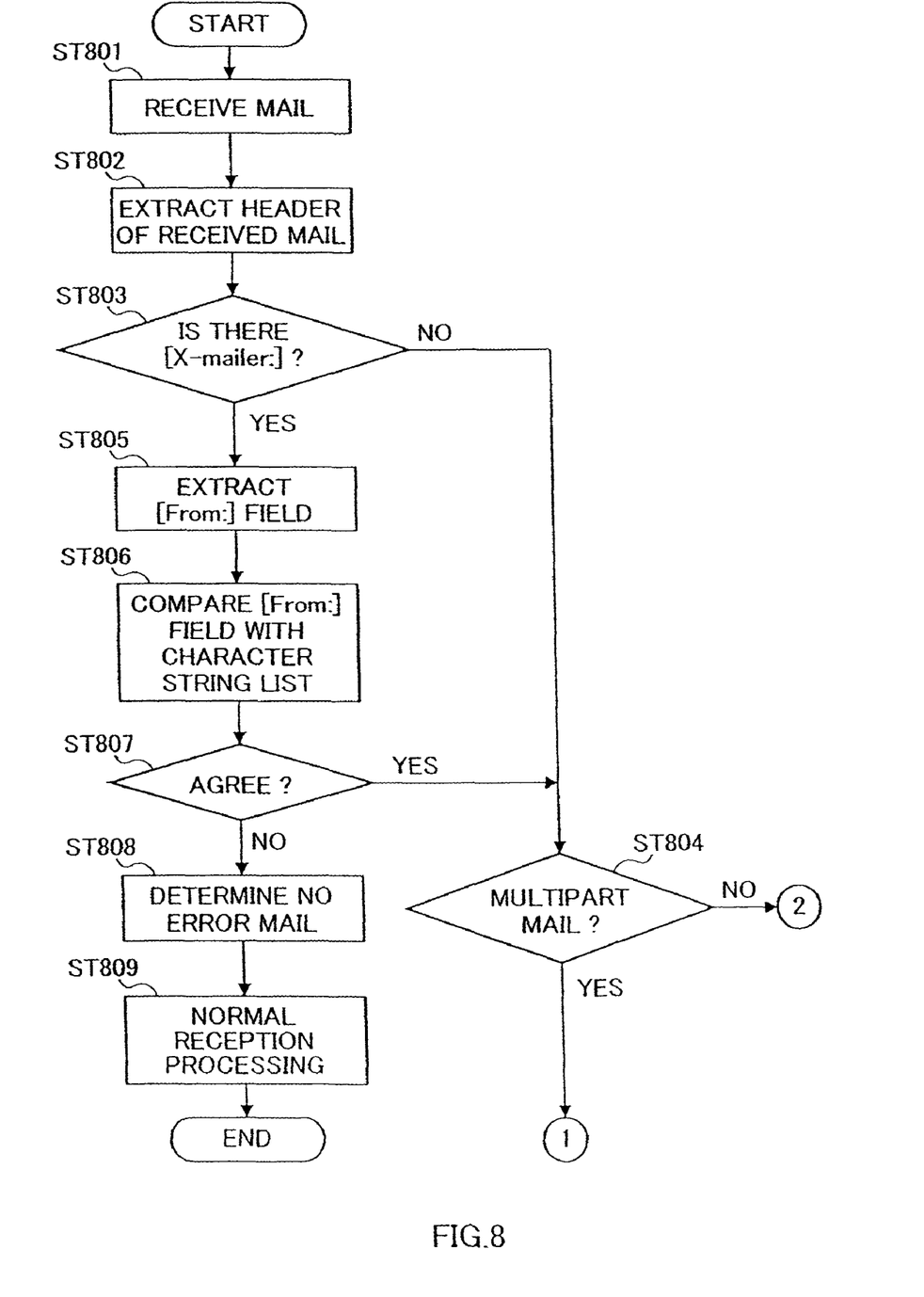
FIG. 8 is a flowchart showing each step of reception processing for received mail data in the Internet facsimile apparatus according to the above embodiment.

The following will explain processing of received mail data in the above-configured IFAX. FIG. 8 is a flowchart showing each step of reception processing for received mail data in IFAX according to the above embodiment.

In step (hereinafter referred to as ST) 801, when the mail receiving section 35 shown in FIG. 3 receives E-mail, the header extraction section 101 of the header analyzing section 100 shown in FIG. 7 extracts the header (61 in FIG. 6) from received mail data in ST802.

Next, in step ST803, [X-mailer:] filed analyzing section 102 checks whether or not [X-mailer:] field is included in the header 61. The determination processing section 500 determines whether or not [X-mailer:] field is included in the header 61 based on this analytical result.

Here, if [X-mailer:] field is not included in the header 61 in step ST803, a possibility arises where this received mail data has been transmitted by the mail server. In other words, there is a high possibility that this received mail data will be error mail. Then, the determination processing section 500 moves processing to ST804.

Also, if [X-mailer:] field is included in the header 61, A possibility that received mail data will be error mail is remained. Here, in ST805, [From:] field analyzing section 103 extracts [From:] field 62 from the header 61. Next, in step S806, [From:] field analyzing section 103 compares this [From:] field with a character string registered in the character string list table 105.

The character string registered in the character string list table 105 is one that may enter [From:] field indicating the sender. Therefore, if both agree, there is high possibility that received mail data will be error mail. Then, the determination processing section 500 moves processing to ST804.

While, if both do not match, received mail data is normal E-mail and there is no possibility that it is error mail. For this reason, in ST808, the determination processing section 500 determines that received data is not error mail, and performs normal reception processing in ST809. In normal reception processing, the entirety of received mail data is printed out by the printer 26. In addition, if IFAX 1 has a display capable of displaying image data and the like, received mail data may be displayed on this display, and received mail data may be transferred to other G3/G4 facsimile by facsimile communications using normal PSTN.

In ST804, the mail structure analyzing section 104 shown in FIG. 7 analyzes the header 61 to check whether received mail data is the multipart structure or the single-part structure. If the header 61 contains a character string, which indicates that received mail data is the multipart structure, (for example, "Content-Type:multipart/mixed), the mail structure analyzing section 104 determines that this received mail data is the multipart mail structure. While, if the header 61 contains a character string, which indicates that received mail data is the single-part structure, (for example, "Content-Type: text/plain), the mail structure analyzing section 104 determines that this received mail data is the single-part mail structure.

Figure 9:
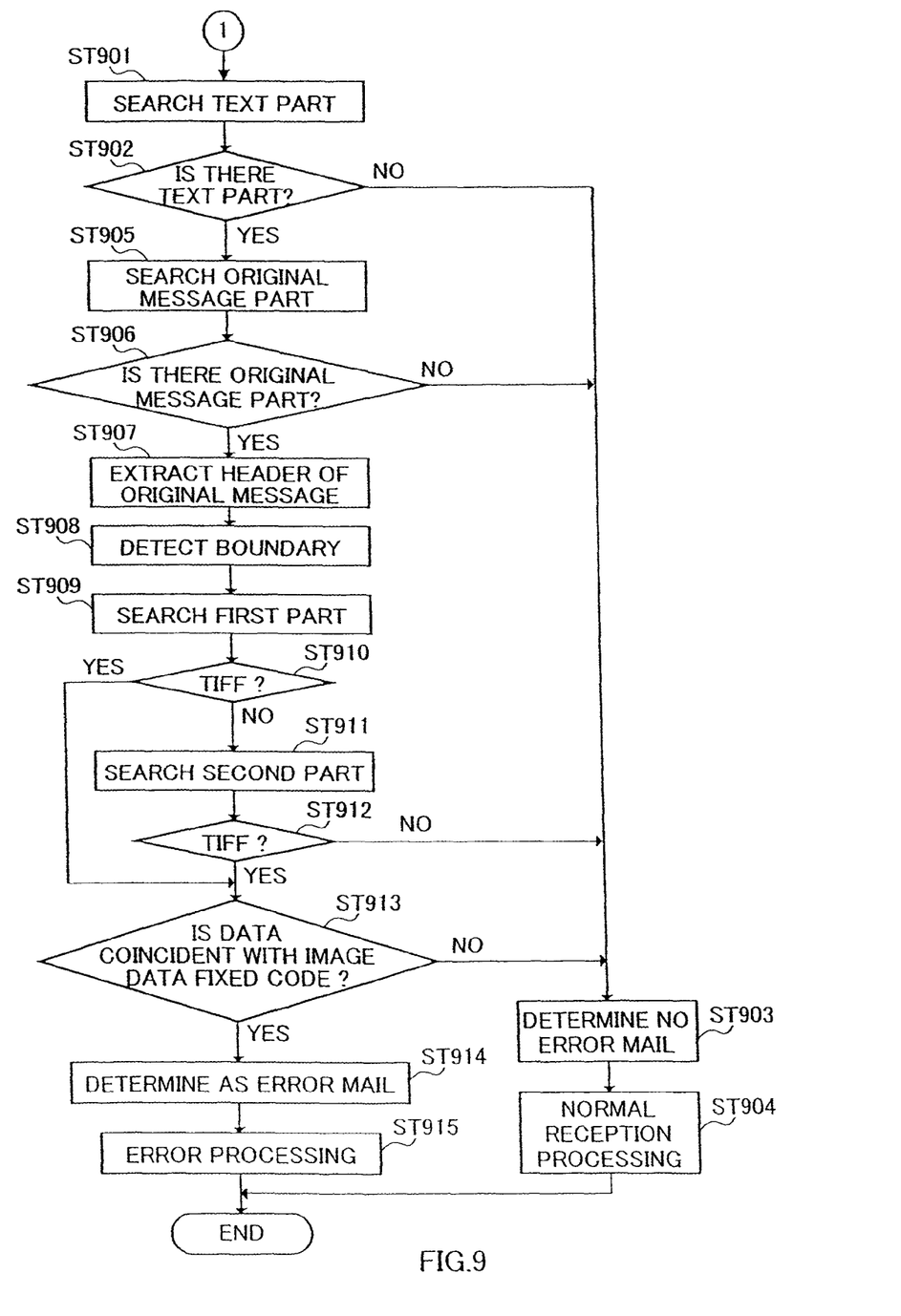
FIG. 9 is a flowchart showing processing when error mail is multipart mail in the Internet facsimile apparatus according to the above embodiment.

In ST804, if received mail data is the multipart structure, the determination processing section 500 performs processing shown in FIG. 9. While, if received mail data is the single-part structure, the determination processing section 500 performs processing shown in FIG. 10.

In the case where received mail data is the multipart structure, received mail data can be analyzed in accordance with this multipart structure to perform processing. FIG. 9 is a flowchart showing processing when error mail is the multipart mail in IFAX according to the above embodiment. In ST901, the text part searching section 201 of multipart mail analyzing section 200 searches a text part from received mail data. This search for text part is performed based on whether or not the sub-header contains a specific character string (for example, "text/plain"), which indicates that the corresponding part is the text part.

The mail server normally puts information relating to error into the text part when generating error mail. For this reason, if there is no text part, this received mail data is not considered as error mail. Then, if there is no text part in ST902, the determination processing section 500 does not determine that received mail data is error mail in ST903, and performs normal reception processing in ST904.

On the other hand, if there is the text part in ST902, the original message part searching section 202 searches the original message part in received message data in ST904. This search for original message part is performed based on whether or not the sub-header contains a specific character string (for example, "message/rfc822"), which indicates that the corresponding part is the original message part.

The mail server normally puts the original message into the accompanying file part when generating error mail. For this reason, if there is no original message part, this received mail data is not considered as error mail. Then, if there is no original message part in ST906, the determination processing section 500 does not determine that received mail data is error mail in ST903, and performs normal reception processing in ST904.

On the other hand, if there is the original message part in ST906, it is checked whether or not data of the original message part is the same as E-mail data transmitted by IFAX by the following processing.

More specifically, in ST907, the original message header extracting section 301 extracts the header 51 of original message. Then, the boundary of this header 51 is detected (ST908). Then, the respective parts are identified based on this boundary, it is confirmed whether or not data is TIFF data for each part. First, in ST909, the first part (text part 54 in FIG. 6) is retrieved. Then, in ST910, a fixed sentence, "Tiff/Image", which indicates that TIFF data exists in this part in a sub-header 70, is fined in the first part. If there is no "Tiff/Image" in the sub-header 70 of the first part, a sub-header 71 of the second part (image part 55 in FIG. 6) is retrieved in ST911. Then, in ST912, "Tiff/Image" of this sub-header 71 is fined in the second part. If there is "Tiff/Image" in either part, it is determined whether or not it is coincident with image data fixed code (SUkq) in ST913. Then, if it is coincident therewith, processing goes to ST914. If there is no "Tiff/Image" in either part, it is determined that this is not error mail, and normal processing is performed (ST903, 904).

In ST913, the image data fixed code comparing section 304 checks whether or not the character string of the top of the image data part 55 of original message 65 coincides with image data fixed code (SUkq) registered in the fixed data table 305. Here, if both disagree, the determination processing section 500 does not determine that received mail data is error mail in ST903 and performs normal reception processing in ST904 since image data is not TIFF file. In this case, the character string, that is, SUkq is always added to the TIFF file transmitted by the present apparatus. However, the character string is not limited to the above-mentioned one, and the character string is different depending on the E-mail conversion system.

On the other hand, if both agree in ST913, the determination processing section 500 determines that received mail data is error mail in ST914 and performs error processing in ST915 since image data is the TIFF file.

Figure 10:
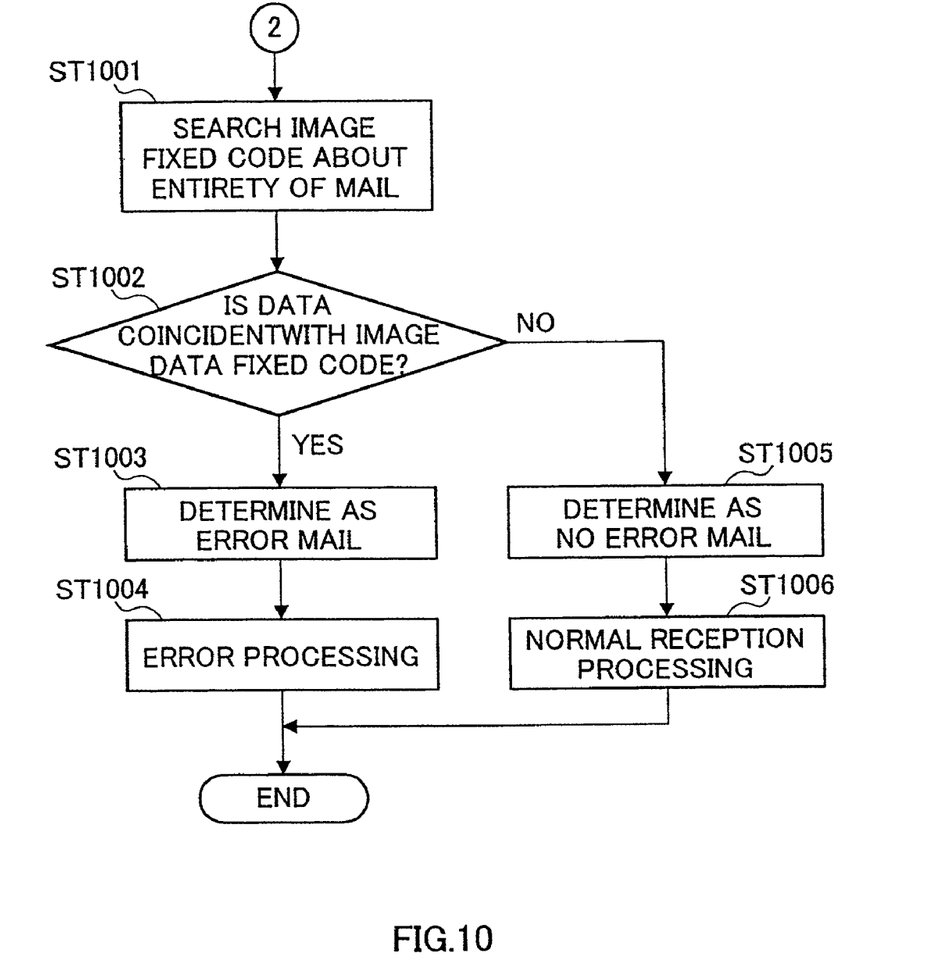
FIG. 10 is a flowchart showing processing when error mail is single-part mail in the Internet facsimile apparatus according to the above embodiment.

Some mail servers generate error mail with the single-part to include the content of original message into error mail as it is. In this case, since it is impossible to analyze the multi part mail shown in FIG. 9, the following processing is performed. FIG. 10 is a flowchart showing processing when error mail is single-part mail in IFAX according to the above embodiment.

In ST1001, the image data fixed code searching section 401 of the single-part mail analyzing section 400 searches the image data fixed code with respect to the entirety of received mail data. Since received mail data is the signal-part structure, it is necessary to scan the entirety of received mail data.

In ST1002, the determination processing section 500 determines whether or not there is an image fixed code based on the searching result of image fixed code searching section 401. Here, if there is the image fixed code, the determination processing section 500 determines that received mail data is error mail in ST1003, and performs error processing in ST1004.

While, if there is no image fixed code in ST1002, the determination processing section 500 does not determine that received mail data is error mail in ST1005, and performs normal reception processing in ST1006.

Error processing in ST912 and ST1004 is performed as follows. The specific information extracting section 43 shown in FIG. 4 extracts information relating to error and specific information of the original document and the like from received mail data. The extracted specific information is converted to image data by the format converting section 42. The data editing section 44 edits converted image data to be contained in one page. The edited data is printed by the print controlling section 44 using the printer 26. In this case, the entirety or part of image data of the original document may be extracted from received mail data.

Figure 11:
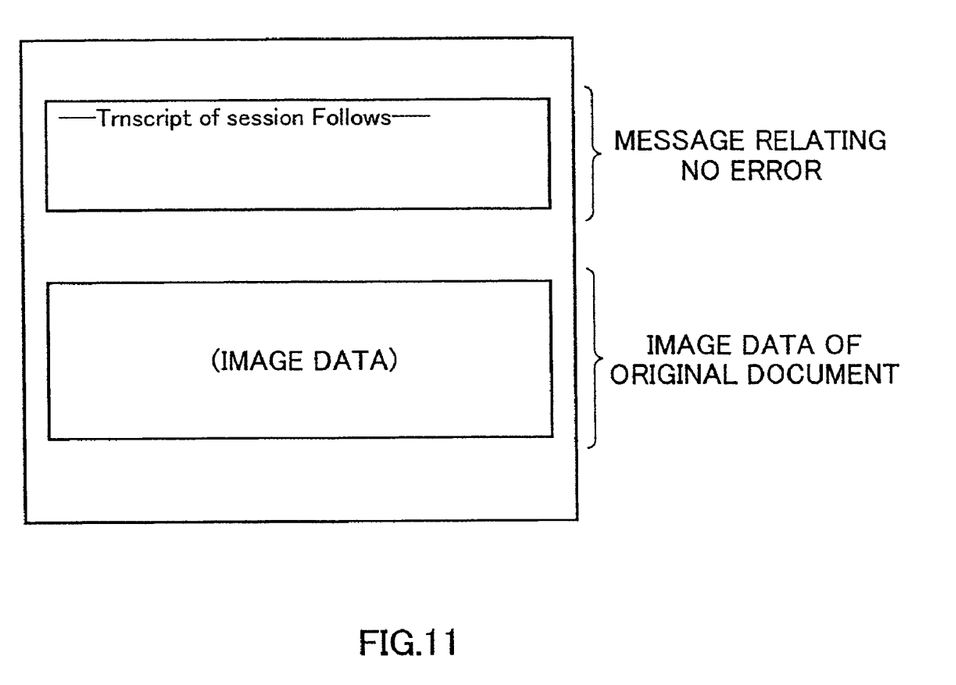
FIG. 11 is a schematic view of error mail, which is output by IFAX in the above embodiment.

FIG. 11 is a schematic view of error mail, which is output by IFAX in the above embodiment. Error information and the original document are edited to be contained in one page and output, there by preventing a waste of recording paper. In addition, the receiver can know which original document fails in transmission and by what error such failure is caused.

Moreover, transfer to G3/G4 facsimile is included as an output of edited data in addition to the above-mentioned printing. In other words, the specific information extracting section 43 extracts information relating to error and image data of the original document from received mail data. The extracted data is converted to facsimile data by the format converting section 42. The converted facsimile data is edited to be contained in one page by the data editing section 44. The edited data is modulated by the FAX and voice processing section 24, and the resultant data is transmitted to G3 facsimile 11 via PSTN 10.

Furthermore, for example, a message to the effect that error mail is received is added to the edited data to generate E-mail and generated E-mail can be transmitted to, for example, a manager.

Moreover, it is possible to display the message to the effect that error mail is received is displayed on the display 46 provided in the panel control section 28 shown in FIG. 4.

In the above embodiment, the document fixed message is not used in identifying error mail. However, in the analysis of original message in ST907 to ST910, it is possible to identify that received mail data is error mail when there is the document fixed message in the original message in addition to ST908 and ST909 or ST910 or in place of either step.

The above-explained IFAX 1 according to the embodiment identifies error mail based on whether or not received mail data includes a character string that the sender of error mail may describe in a sender field, e.g., [From:] field. This makes it possible to identify error mail surely even when error mail is identified based on coincidences of the header fixed messages, document fixed messages, or image data fixed codes, and the mail server, which is incapable of performing identification, does not accompany with error mail as it is. More specifically, the error mail is transmitted from the server, which rewrites the portion (boundary="+-+-MGCS-+-+) that defines the boundary character string of the header of the original message.

Moreover, IFAX 1 according to the above embodiment determines whether or not received mail data is the multipart structure or single-part structure. Then, if it is the multipart structure, IFAX 1 searches the original message part to which the original message is appended, and checks whether or not the image data fixed code is included in the top of the image data part of this original message part. On the other hand, if it is the single-part structure, IFAX 1 scans received mail data and searches the image data fixed code. As a result, according to the above-mentioned embodiments error mail is identified by the method suitable for each structure after the structure of received mail data structure is determined, and this makes it possible to identify error mail more surely.

As explained above, IFAX according to the above embodiment can distinguish error mail from normal E-mail. Then, when error mail is received, IFAX can extract necessary information from received mail data, edit extracted data as required, and output it. This allows resources such as recording paper to be saved.

In addition, according to the above embodiment, it is determined whether or not a predetermined character string exists in [From:] field. If there is no predetermined character string, it is judged whether or not data is error mail based on coincidences the image data fixed codes. However, the predetermined character string exists in at least [From:] field, data may be determined as error mail to simplify processing.

A criterion of judgment on error mail will be supplementary explained. In ST803, the presence or absence of X-mail filed is judged. If there is no X-mailer filed, there is a possibility that data will be error mail. X-mailer filed is generated by software and added, and the server does not generate it. Error mail is generated by the server and returned to the sender. In many cases of error mail, [X-mailer:] field does not exist.

In ST807, it is judged whether or not the content of [From:] field indicates the predetermined one (character string). If the predetermined character string (sender) is described in [From:] field, the data is judged as error mail. In the case of generating error mail, the character string described in [From:] field is determined to some degree.

In ST902, the existence or absence of text part is determined. Error mail always exists in the text part. Therefore, when there is no text part, the data is not judged as error mail.

In ST906, the existence or absence of original message part is determined. In many cases, the original message is added to error mail. Therefore, when there is no original message part, the data is not judged as error mail.

In ST909, the existence or absence of SUkq is determined. Transmitting data of IFAX is always sent with the accompanying file, so that the accompanying file is naturally attached to the error mail. The accompanying file is TIFF and SUkq is added. By detecting the existence of SUkq, it is judged whether or not data is transmitted by IFAX.

According to the above embodiment, error mail can be determined surely based on the above five conditions. However, the present invention is not limited to these. Error mail may be determined based on at least the existence or absence of [From:] field, the existence or absence of [X-mailer:] field and the existence of SUkq. The criterion of judgment on error mail can be effectively performed in order of the existence or absence of [From:] field, the existence or absence of [X-mailer:] field and the existence of SUkq, existence of text part, existence of original message. Therefore, some conditions may be selected as a criterion of judgment from them.

The above explained the case of IFAX. The present invention, however, can be applied to E-mail apparatuses other than the above. For example, in PC having a facsimile modem built-in or connected thereto, it is possible to recognize whether received mail data is error or delivery status notification mail. In addition, necessary data is extracted from received mail data, extracted data is edited as required, and edited data can be transmitted to G3 facsimile by facsimile communications. Moreover, edited data can be printed out by the printer connected to PC, displayed on the display, and transmitted by E-mail.

Furthermore, it is possible to add a network interface section and a network corresponding unit, which performs the recognition of E-mail, data extraction, and E-mail edition and the like, to the known G3 facsimile as options.

Moreover, even in a case where a network interface section and a network adapter, which performs the recognition of E-mail, data extraction, and E-mail edition and the like, to the known G3 facsimile, the same function as that of IFAX of the embodiment of the present invention can be exerted.

This invention may be conveniently implemented using a conventional general purpose digital computer or microprocessor programmed according to the teachings of the present specification, as well be apparent to those skilled in the computer art. Appropriate software coding can readily be prepared by skilled programmers based on the teachings of the present disclosure, as will be apparent to those skilled in the software are. The invention may also be implemented by the preparation of application specific integrated circuits or by interconnecting an appropriate network of conventional component circuits, as will be readily apparent to those skilled in the art.

The present invention includes a computer program product which is a storage medium including instructions which can be used to program a computer to perform a process of the invention. The storage medium can include, but is not limited to, any type of disk including floppy disks, optical discs, CD-ROMs, and magneto-optical disks, ROMs, RAMs, EPROMs, EEPROMs, magnetic or optical cards, or any type of media suitable for storing electronic instructions.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. An image communication apparatus comprising:
   a transmitter configured to transmit an outgoing e-mail with data attached, via a computer network;
   a receiver configured to receive an e-mail with data attached, via the computer network; and
   a controller configured to convert the attached data into image data;
   the controller further being configured to judge whether or not the received e-mail is an error mail, the error mail being related to the e-mail transmitted by the image communication apparatus and representing a failure of an e-mail transmitted by the transmitter to be received, based on a search of a header of the received e-mail for a predetermined character string, the predetermined character string being related to a sender of the error mail, and being set into the header of the received e-mail by a server, and to determine that the received e-mail is the error mail, when the result of the search indicates that the header of the received e-mail includes the predetermined character string.

2. The image communication apparatus according to claim 1, further comprising a printer configured to print the image data, wherein the controller, when an error mail is detected, abstracts predetermined information from the e-mail, and converts the abstracted predetermined information into image data, and the printer prints the converted image data.

3. The image communication apparatus according to claim 1, further comprising a printer configured to print image data, wherein the controller, when an error mail is detected, abstracts a predetermined information from the e-mail, edits the abstracted predetermined information, and converts the edited information into image data, and the printer prints the converted image data.

4. The image communication apparatus according to claim 1, the transmitter and the receiver being configured to transmit and receive e-mail via at least one server.

5. The image communication apparatus according to claim 1, the controller being configured to compare a character string in the header with a list of character strings to determine if the character string in the header is the predetermined character string.

6. The image communication apparatus according to claim 1, the predetermined character string comprising one of DEAMON, mailer, DELIVERY, SYSTEM, and POST MASTER.

7. The image communication apparatus according to claim 1, the predetermined character string being distinct from address data.

8. An image communication method comprising:
   transmitting an outgoing e-mail with data attached, via a computer network;
   receiving an e-mail with data attached, via the computer network;
   converting the attached data into image data; and
   judging whether or not the received e-mail is an error mail, the error mail being related to the e-mail transmitted by the image communication apparatus and representing a failure of a transmitted e-mail to be received, based on a search of a header of the e-mail for a predetermined character string, the predetermined character string being related to a sender of the error mail and being set into the header of the received e-mail by a server; and determining that the received e-mail is the error mail, when the result of the search indicates the received e-mail includes the predetermined character string.

9. The image communication method according to claim 8, further comprising:

abstracting predetermined information from the e-mail when an error mail is detected;

converting the abstracted predetermined information into image data; and printing the converted image data.

10. The image communication method according to claim 8, further comprising:

abstracting predetermined information from the e-mail when an error mail is detected;

editing the abstracted predetermined information;

converting the edited predetermined information into image data; and printing the converted image data.

11. The image communication method according to claim 8, the transmitting and the receiving of the e-mail through the computer network taking place via at least one server.

12. The image communication method according to claim 8, the judging comprising comparing a character string in the header with a list of character strings to determine if the character string in the header is the predetermined character string.

13. The image communication method according to claim 8, the predetermined character string comprising one of DEAMON, mailer, DELIVERY, SYSTEM, and POST MASTER.

14. The image communication method according to claim 8, the predetermined character string being distinct from address data.

* * * * *